(12) United States Patent
Fahley

(10) Patent No.: US 6,499,211 B1
(45) Date of Patent: Dec. 31, 2002

(54) HOLDING TRAY

(75) Inventor: Terry R. Fahley, Lakeville, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/839,341

(22) Filed: Apr. 20, 2001

Related U.S. Application Data

(62) Division of application No. 09/204,415, filed on Dec. 2, 1998, now Pat. No. 6,315,125, which is a division of application No. 08/846,280, filed on Apr. 30, 1997, now Pat. No. 5,966,271.

(51) Int. Cl.[7] .................. H02K 15/03; G11B 5/127; H04R 31/00
(52) U.S. Cl. .................. 29/603.03; 29/596; 148/108
(58) Field of Search .................. 148/108; 29/596, 29/603.03

(56) References Cited

U.S. PATENT DOCUMENTS

| | | | |
|---|---|---|---|
| 4,169,532 A | 10/1979 | Scapellati | 206/557 |
| 4,935,080 A | 6/1990 | Hassell et al. | 156/154 |
| 5,260,618 A | 11/1993 | Dunfield et al. | 310/154 |
| 5,270,887 A | 12/1993 | Edwards et al. | 360/106 |
| 5,396,388 A | 3/1995 | Brown | 360/106 |
| 5,459,362 A | 10/1995 | Dunfield et al. | 310/154 |
| 5,477,401 A | 12/1995 | Squires et al. | 360/97.02 |
| 5,536,984 A | 7/1996 | Stuart et al. | 310/13 |
| 5,537,270 A | 7/1996 | Morehouse et al. | 360/97.02 |
| 5,570,250 A | 10/1996 | Casey | 360/106 |
| 5,669,516 A | 9/1997 | Horn | 211/70.6 |
| 5,783,370 A | * 7/1998 | Groom et al. | 269/903 |
| 6,006,906 A | 12/1999 | Winnard | 206/350 |
| 6,145,189 A | * 11/2000 | Fahley | 29/596 |

OTHER PUBLICATIONS

FIGS. A0–1 and A0–2 illustrating assembly device (Prior to Apr. 30, 1997).

* cited by examiner

Primary Examiner—John Sheehan
(74) Attorney, Agent, or Firm—Westman, Champlin & Kelly, P.A.

(57) ABSTRACT

A storage tray for storing magnetized magnets for assembly in a disc drive. The tray includes a base having a support surface and a cover sized to cover the support surface. The base is formed of a material having magnetic properties for attracting magnetized magnets for removably supporting the magnets until assembled in a voice coil motor.

4 Claims, 14 Drawing Sheets

HOLDING TRAY

REFERENCE TO RELATED APPLICATION

This application is a Divisional Application of U.S. Ser. No. 09/204,415 filed Dec 2, 1998 now U.S. Pat. No. 6,315,125 which is a Divisional Application of U.S. Ser. No. 08/846,280 filed Apr. 30, 1997, issued Oct. 12, 1999 as U.S. Pat. No. 5,966,271.

FIELD OF THE INVENTION

The present invention relates to an apparatus and method for assembly of a stator of a motor for operating an actuator of a disc drive. In particular, the present invention relates to a storage device and assembly method for magnetized magnets for a voice coil motor.

BACKGROUND OF THE INVENTION

A disc drive includes a plurality of stacked discs which are rotationally supported relative to a disc spindle and an actuator assembly movably supporting a plurality of head gimbal assemblies for reading and writing data to the discs. The actuator assembly includes an actuator drive typically a voice coil motor for actuating the head gimbal assemblies relative to selected data tracks of the discs.

The voice coil motor includes a stator defining a permanent magnetic field and a rotor coupled to an actuator block supporting the head gimbal assemblies. The rotor includes a bobbin having a voice coil wound about the bobbin. A voltage is supplied to the coil to selectively operate and move the actuator block to align the head gimbal assemblies relative to predetermined data tracks of the discs.

A typical stator includes upper and lower pole plates or backirons which are supported relative to the disc drive assembly in a spaced relation and include a magnet coupled thereto to define a flux gap therebetween. The rotor (bobbin and voice coil) coupled to the actuator block moves in the flux gap between the upper and lower pole plates.

Increased capacity disc drives are consistently being developed which have different operating requirements. For example, high density drives have developed which require higher capacity motors for moving the actuator block. Thus, it was desirable to develop a higher capacity actuator drive for providing more power for operating the actuator block of an increased capacity disk. However, higher energy magnets which are sufficient to operate an actuator block of an increased capacity disc of the type described are difficult to energize, handle, and assemble to form an actuator drive with known apparatus and techniques.

SUMMARY OF THE INVENTION

The present invention relates to a tray for storing magnetized magnets for assembly in a disc drive. The tray includes a base having a support surface and a cover sized to cover the support surface. The base is formed of a material having magnetic properties for attracting magnetized magnets for removably supporting the magnets until assembled in a voice coil motor. These and other features, which characterize the present invention, will be apparent from the following detailed description and Figures.

DETAILED DESCRIPTION OF THE PREFERRED EMBODIMENTS

Figure 1:
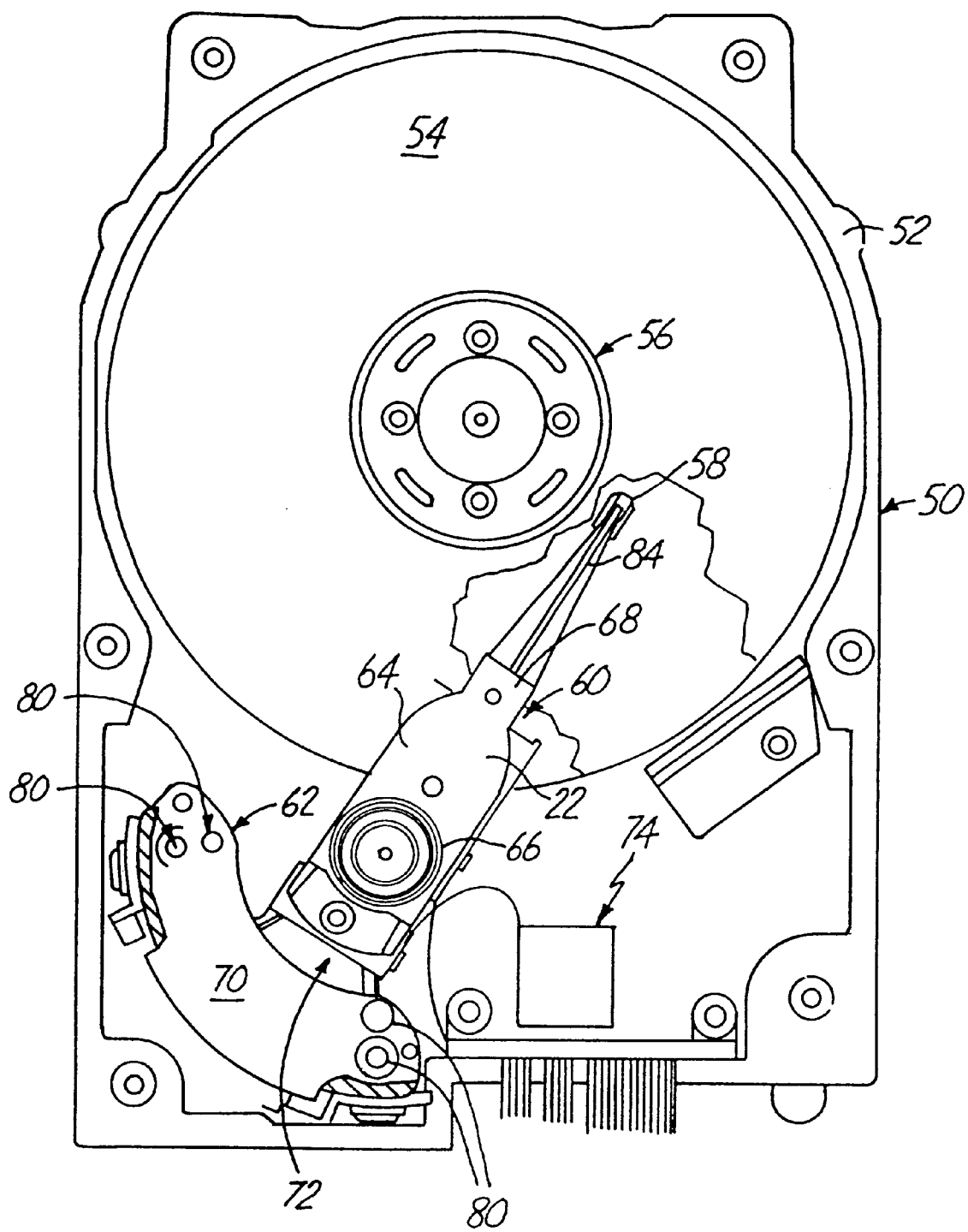
FIG. 1 is a plan view of a disc drive assembly illustrating an actuator assembly for positioning head gimbal assemblies relative to selected data tracks of discs.

FIG. 1 is a plan view of a typical disc drive 50 in accordance with the present invention. Disc drive 50 includes housing 52 and disc assembly 54 which is mounted on a spindle motor (not shown) by a disc clamp 56. Disc assembly 54 includes a plurality of individual discs (only one disc shown in FIG. 11) which are mounted for co-rotation about a central axis. Each disc surface has an associated head gimbal assembly (HGA) 58 which is mounted to the disc driver 50 via actuator assembly 60.

Assembly 60 includes actuator drive 62 and actuator base 64 rotationally coupled to housing 52 at bearing 66. Drive 62 operates base 64 for positioning head assemblies 58 over desired data tracks via the control of electronic circuitry. Assemblies 58 are coupled to base 64 via spaced actuator arms 68. The head gimbal assemblies 58 includes sliders supporting transducers for reading and writing data to discs.

The actuator drive 62 is a voice coil motor which includes stator 70 and rotor 72. Stator 70 is a stationary permanent magnet coupled to housing 52. Rotor 72 is a coil actuator which is operably coupled to base 64, which includes magnetic bobbin having a voice coil wound therearound and electrically coupled to actuator controller 74.

Figure 2:
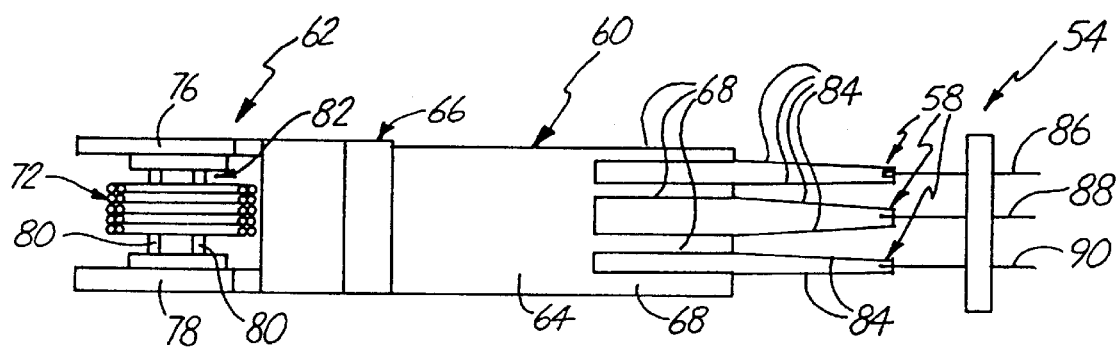
FIG. 2 is a plan view illustrating the stator and rotor of the motor of the actuator assembly.

FIG. 2 is an illustrative view of the operation of assembly 60. Stator 70 is formed of upper and lower permanent magnet and backiron assemblies 76 and 78. Assemblies 76 and 78 are supported in spaced relation via rods 80 to define a flux gap 82. The invention is not limited to a stator have both upper and lower permanent magnet and backiron assemblies 76 and 78 alternate arrangements of magnets coupled to upper and lower pole plates or backirons, such as magnet bonded to either an upper or lower backiron, are within the scope of the invention.

Rotor 72 operates within flux gap 82 to position assemblies 58, coupled to actuator arms 68 via load beams 4, relative to selected data tracks of discs 86, 88, and 90. Previous voice coil motor assemblies used relatively low energy magnets which were energized or "charged" with available equipment. The low energy magnets were relatively easy to handle for assembly to a backiron pole plate. However, such magnets are not sufficient to operate an actuator motor for high capacity drives at high speed.

Figure 3:
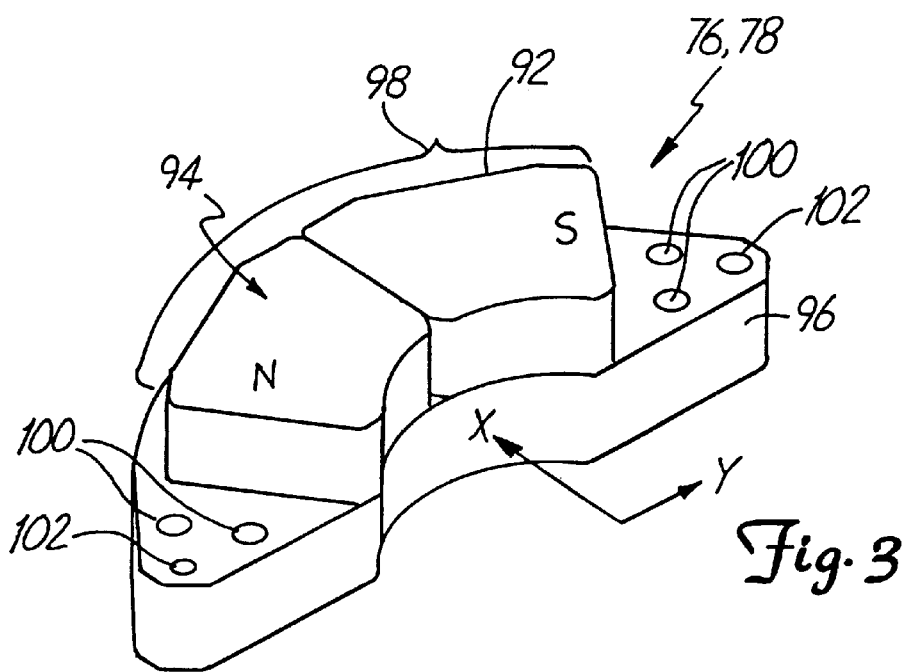
FIG. 3 is a perspective view of a magnet and backiron assembly.
Figure 4:
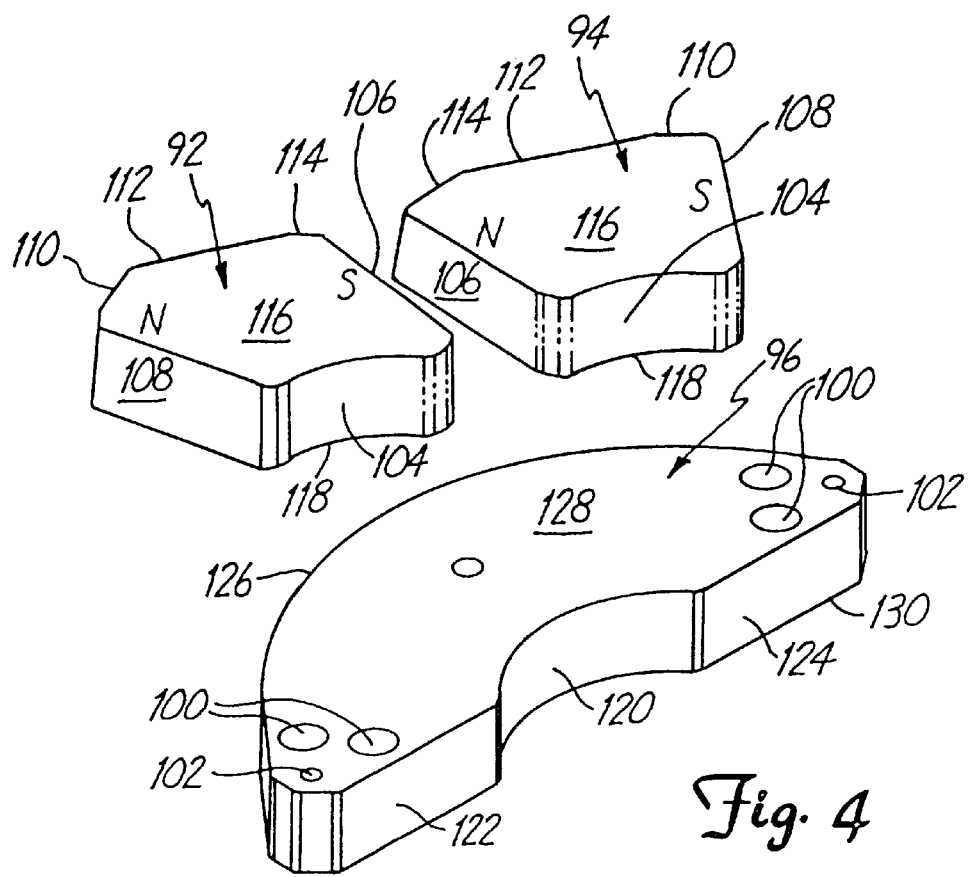
FIG. 4 is an exploded view of a magnet and backiron of a magnet and backiron assembly.

FIGS. 3 and 4 illustrate construction of a high energy magnet 98 of the present invention for use in increased capacity disc drives such as 23 and 46 gigabyte drives. A plurality of magnet segments 92 and 94 couple to backiron (or pole plate) 96 to form high energy magnet and backiron assembly 76, 78. The high energy magnet 98 is formed of magnet segments 92, 94, which are construed of a material having an energy charge rating of 45 MGOe plus of minus 5%, such as neodymium-iron-boron magnets. The surface area of the magnet is preferably approximately 14.258 inches$^2$ (91.98 cm$^2$) to provide a magnet having a flux density of approximately 110,000 lines minimum flux.

Separate magnet segments 92, 94 are used to construct the high energy composite magnet 98 since the magnet 98 has a width greater (i.e., 2.75 inches, 6.9 cm) than the active charging zone of a standard charging apparatus. Each magnet segment 92 and 94 is separately energized prior to assembly to the backiron 96. Since separate magnets 92, 94 are used, the composite magnet 98 can be energized using the same charging equipment used to charge prior art magnets. Preferably, segments 92 and 94 are neodymium-iron-boron magnets with a nickel coating. Segments 92 and 94 form the composite high energy magnet 98 which is bonded to the backiron 96.

The magnetic strength of the energized magnet segments 92 and 94 is 100–120 lbs. on exposed flats to backiron. The high energy composite magnet has a higher strength than previous disc drive magnets and higher strength than what is possible to assembly by hand. Preferably, the backiron 96 is formed of a steel material and is 0.47 inches )11.9) thick. It should be appreciated by those skilled in the art that the material choices and parameters are merely design choices and that the scope of the invention is not limited to the specific materials or parameters described.

Backiron 96 includes holes 100 and 102 which receive rods 80 to secure backirons 96 to disc drive 50. FIG. 4 is an exploded view showing assembly of the segments 92, 94 to form composite magnet 98. Segments 92, 94 include curved front surface 104, side edges 106 and 108, back edges 110, 112 and 114 and upper and lower faced 116 and 118 to define a curved shaped magnet. Magnet segments 92 and 94 are magnetized such that the magnetic field is aligned between edges 106 and 108. Segments 92, 94 are bonded at edges 106 and have magnetic fields as illustrated. Backiron 96 includes curved front surface 120, front edges 122 and 124, curved back surface 126 and upper an lower faced 128 and 138 to define a curved shaped backiron 96. Composite magnet 98 is bonded to the upper face 128 of the backiron 96.

Bonding of Magnet Segments 92 and 94

The high energy of segments 92, 94 make it difficult for a person to handle and join magnet segments 92, 94 manually. Thus, it is necessary to control the magnetic attraction of segments 92, 94 when bonding so that they do not crack or break. Preferably, segments 92, 94 are neodymium magnet(s) with a nickel coating. Damage to the nickel coating can lead to debris in the disc drive, which can cause loss of data or head crashes.

Figure 5:
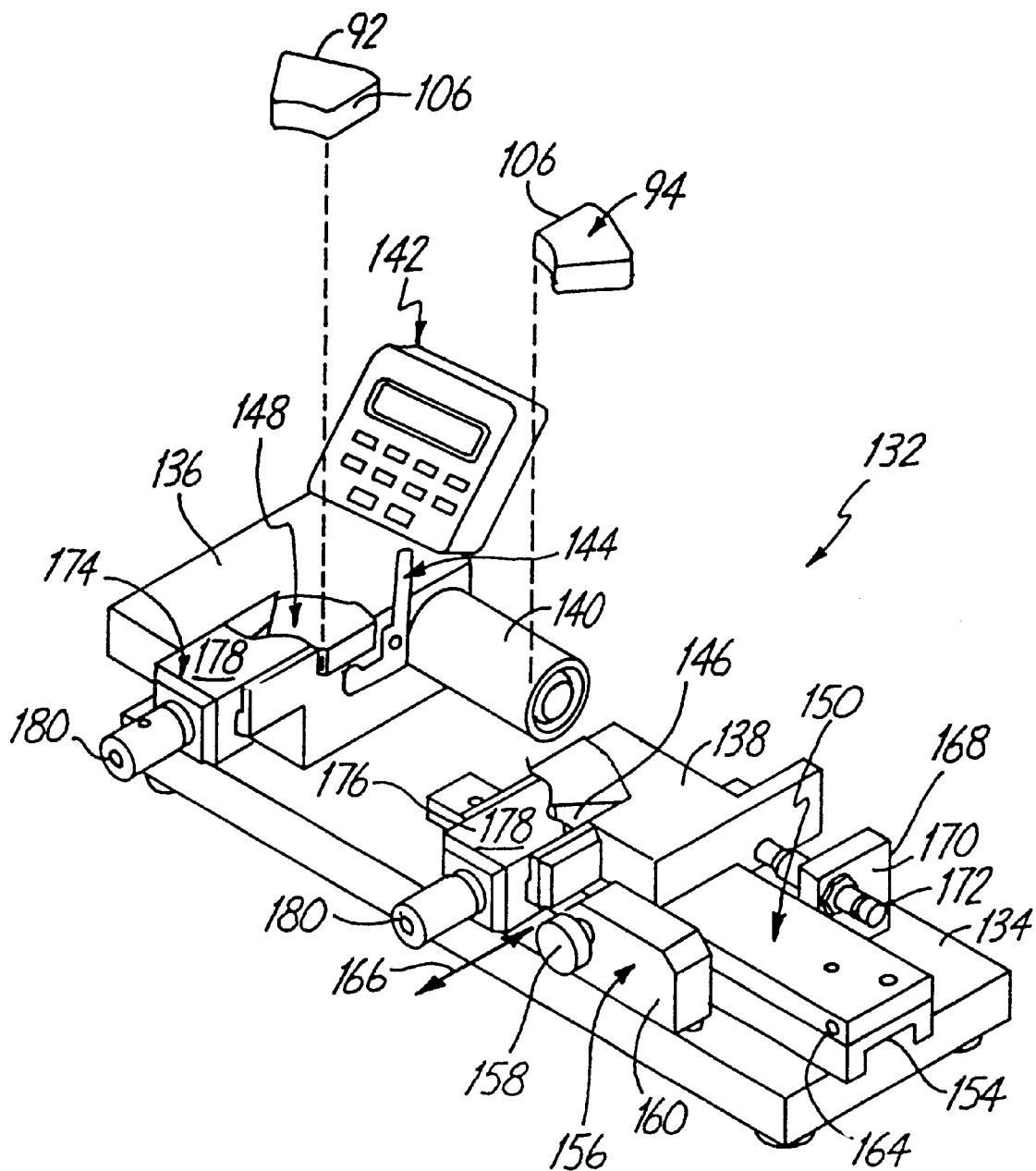
FIG. 5 is a perspective view of a magnet segment bonding assembly.

FIG. 5 is a perspective view of a magnet segment bonding assembly 132 for bonding segments 92, 94. Magnet segment bonding assembly 132 includes base 134, fixed platform 136, movable platform 138 are supported relative to base 134. Movable platform 138 and fixed platform 136 include right and left magnet nests 146 and 148 for securing right and left magnet segments 92 and 94, respectively.

Slide 150 is movably supported along track 152 via groove 154 between a retracted (shown) position and a forward bonding position. When retracted, platform 138 is in a non-operational position such that segments 92, 94 are spaced apart. In the forward bonding position, slide 150 supports platform 138 in close proximity to platform 136 to align segments 92, 94 for bonding.

Operation of slide 150 along track 152 is controlled by slide detent assembly 156. Assembly 156 includes detent latch pin 158, support block 160 and retracted and forward detent bores 162 (not shown) and 164 coupled to slide 150. Block 160 is fixed to base 134 of assembly 132 and supports pin 158 which moves as indicated by arrow 166 to selectively engage retracted and forward detent bores 162, 164 for selectively securing the slide 150 (and movable platform 138) in the retracted and forward positions.

Prior to bonding, movable platform 138 is maintained in the retracted position via pin 158 in bore 162. To bond magnet segments 92 and 94, pin 158 is released from bore 162 so that platform 138 is attracted towards platform 136. Movement of platform 138 toward platform 134 is controlled via shock absorber 140 to prevent platform 138 from slamming into platform 136 and cracking segments 92, 94. After segments 92, 94 are joined, bonded magnet 98 is ejected, via lever 144 and pin 158 is released from bore 164 and moved to bore 162. Backstop 168 limits the retracted position. Backstop 168 includes a support 170 and sock absorber 172.

Segments 92 and 94 are secured within nests 146, 148 via clamps 174, 176. Clamps 174, 176 include clamp blocks 178 and clamp knobs 180. Blocks 178 are movably coupled relative to platforms 136 and 138 to move between a clamped position and an opened position, not shown, to segments 92, 94 via operation of knobs 180.

Figure 6:
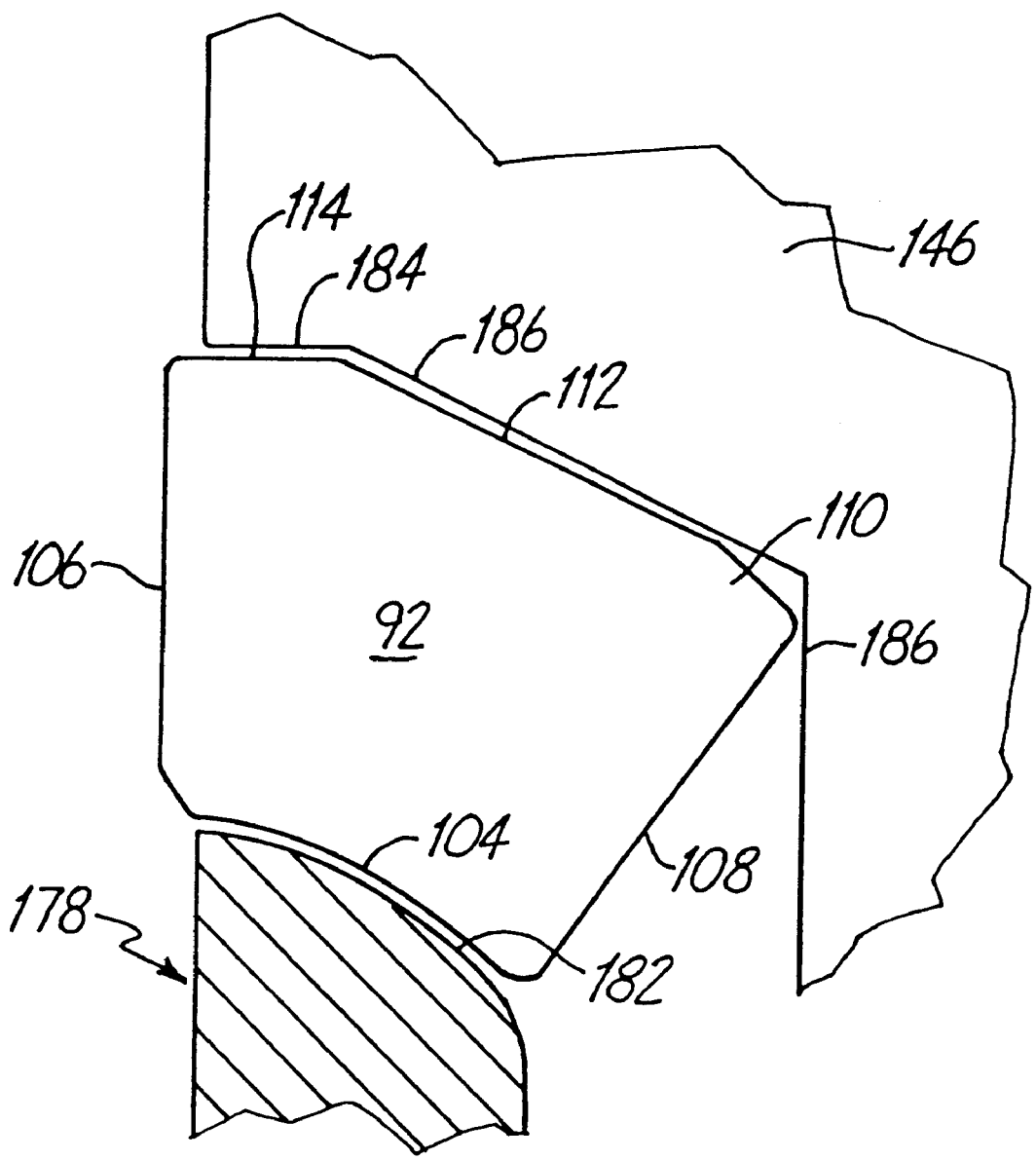
FIG. 6 is a detailed plan view illustrating a magnet segment in a magnet nest of the magnet segment bonding assembly.

FIG. 6 is a detailed view illustrating magnet segments 92, 94 secured in nests 146, 148. Clamp blocks 178 include curved shaped clamp edges 182 which are shaped similar to the curved front surface 104 of the segments 92, 94. Nests 146, 148 are shaped similar to segments 92, 94. Nests 146 and 148 include nest walls aligned relative to edges 114, 112 and 110/108, respectively. Preferably, the nests 146 and 148 are formed of a stainless steel material so that the magnet segments 92, 94 are not attracted to nests 146 and 148.

Segments 92, 94 are inserted into nests 146, 148, and knobs 180, are tightened to force edges 182 against the segments 92, 94. Adhesive is applied ¹⁄₁₆th of an inch (0.158 cm) in diameter, and two drops are applied ¼th inch (0.632 cm) from opposed ends of edges 106 of segment 92. Primer is added to segments 92, 94 prior to insertion into assembly 132.

Pin 158 is released from bore 162 to release slide 150. Platform 138 may be pushed slightly towards platform 136 until the magnetic attraction pulls platform 138 towards platform 136. When edges 106 of segments 92, 94 are aligned, magnet clamps 174, 176 are loosened (by loosening clamp knobs 180) to bond segments 92, 94.

Timer 142 is used to monitor bonding time and is set for 20 seconds. After the segments 92, 94 have bonded, blocks 178 are released, ejection lever 144 is rotated to eject composite magnet 98. The operator may then verify that segments 92, 94 are correctly aligned (described below)

Magnet and Backiron Bonding Assembly

Figure 7:
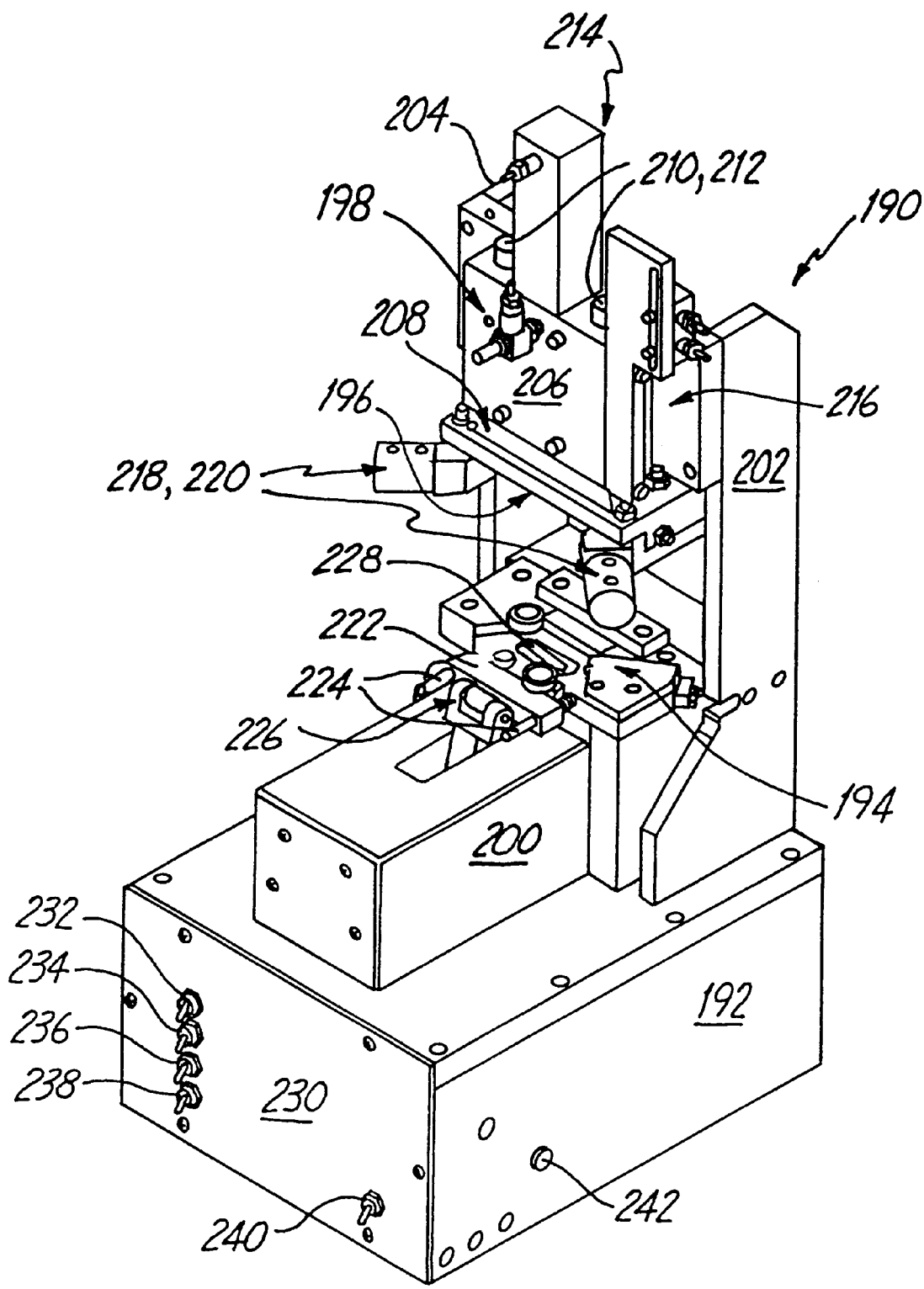
FIG. 7 is a perspective view of a magnet and backiron bonding assembly.

Composite magnet 98 is bonded to backiron 96 to form the magnet and backiron assembly 76, 78. The high strength of magnet 98 makes it difficult for a person to handle magnet 98 and assemble to backiron 96. FIG. 7 is a perspective view of a magnet and backiron bonding assembly 190 for such, which is designed to bond a high energy magnet to a backiron.

Assembly 190 includes base 192, magnet nest 194, backiron nest 196 and slide assembly 198. Nest 194 is stationarily supported relative to base 192 via magnet nest platform 200. Slide assembly 198 is supported above magnet nest 194 via posts 202, 204. Nest 196 is movably supported by slide assembly 198 to selectively move relative to nest 194 between a retracted position shown and a bonding position (not shown). Although, the apparatus is being described having a stationary magnet nest 194 and a movable backiron nest 196, it should be understood that the invention is not limited to this particular arrangement and other arrangements may be used without departing from the scope of the invention, such as a movable magnet nest 194 and a stationary backiron nest 196.

Assembly 198 includes slide base 206, slide 208, slide rods 210 and 212, and slide actuator 214. Base 206 is fixedly supported relative to post 202, 204 via plate 216. Rods 210, 212 are movably supported relative to base 206. Slide 208 is fixedly coupled to rods 210, 212, and thus movably supported relative to base 206. Movement of slide 208 relative to slide base 206 is actuated by actuator 214. Nest 196 is fixedly coupled to slide 208 and moveable therewith between the retracted position and the bonding position. Backiron 96 is secured within nest 196 via backiron clamps 218, 220.

Composite magnet 98 is secured or retained within the nest 194 during operation via a back clamp assembly and a magnet retaining core assembly. Back clamp assembly includes back clamp 222 supported relative to nest 194 via track rods 224 to move between retracted and clamped positions. When retracted, clamp 222 is not aligned with nest 194 so that magnet 98 may be inserted. In the clamped position, clamp 222 abuts nest 194 and an inserted magnet 98 to secure magnet 34. Movement of clamp 222 along rods 224 is controlled by back clamp actuator 226. The magnet retaining core assembly includes retaining core 228 formed of a magnetic matt 98 and retain magnet 98 in nest 194 during merge of magnets-backiron.

Operation of assembly 190 is control via operation switches on base 192. Front control panel 230 includes high and low pressure back clamp toggle switches 232, 234, retaining core toggle switch 236, backiron clamp toggle switch 238 and up/down directional toggle switch 240. Switches 232, 234 operate actuator 226 for moving clamp 222 along rods 224. Switch 236 operates the retaining core assembly. Switch 238 operates clamps 218, 220.

Switch 240 is coupled to actuator 214 for selecting direction of slide 208. Operation of slide 208 is controlled via on/off slide actuator toggle switch (not shown in FIG. 7) for incrementally moving slide 208. To operate the slide 214, on off slide actuator toggle switch must be in the "on" position. Thereafter, an operator depresses buttons 242, 244 on opposed slides of base 192. Both buttons 242, 244 must be presses simultaneously to operate slide actuator 214. Actuator 214 either a raises or lowers slide 208 depending upon the direction switch 240.

Figure 8:
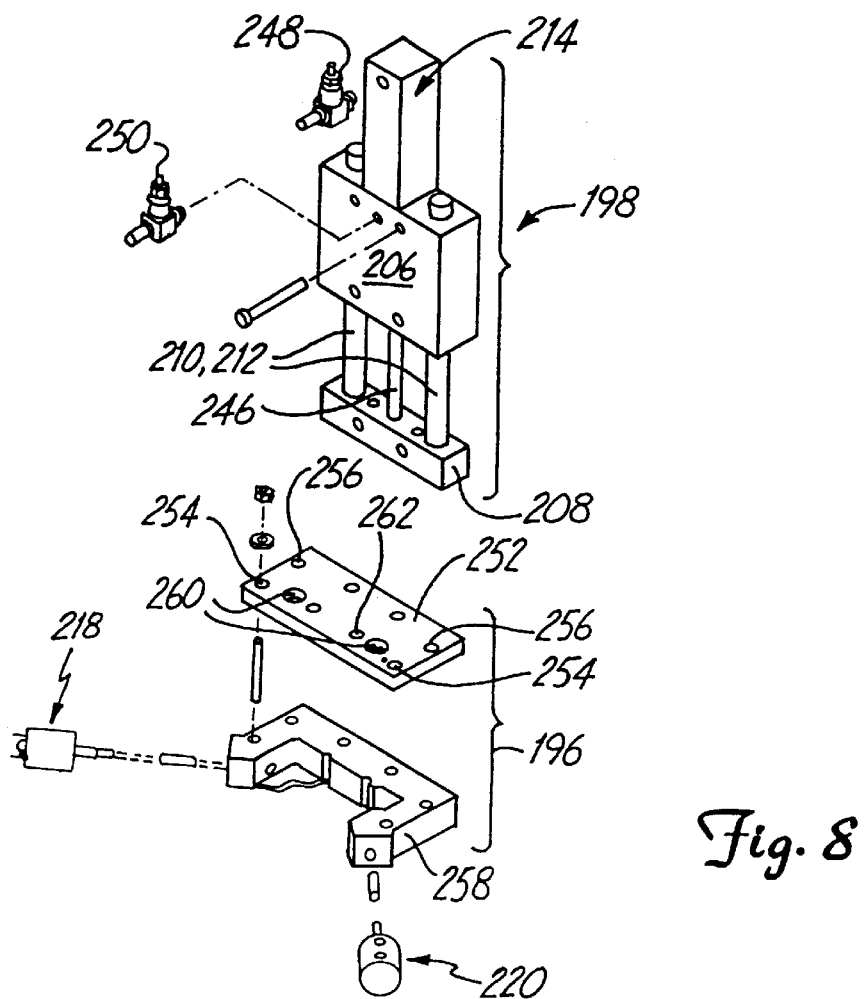
FIG. 8 is an exploded perspective view of a slide assembly and backiron nest of the magnet and backiron bonding assembly.

FIG. 8 is a detailed perspective view of assembly 198 and nest 196. Movement of slide 108 relative to base 206 is accomplished by an extendable actuator rod 246 movable between a retracted position (FIG. 7) and an extended bonding position (FIG. 8). Actuator rod 246 is selectively actuated between the retracted position and the extended position via extension port 248 and retraction port 250. Nest 196 is movably coupled to slide 108 via nest plate 252. Plate 252 includes spaced attachment holes 254, 256 to adjustably attach the plate 250 to base 258 at spaced locations. Attachment holes 260 are used to attach nest plate 252 to slide 208. Plate 252 also includes alignment holes 262 for use in aligning backiron 96 within nest 196.

Figure 9:
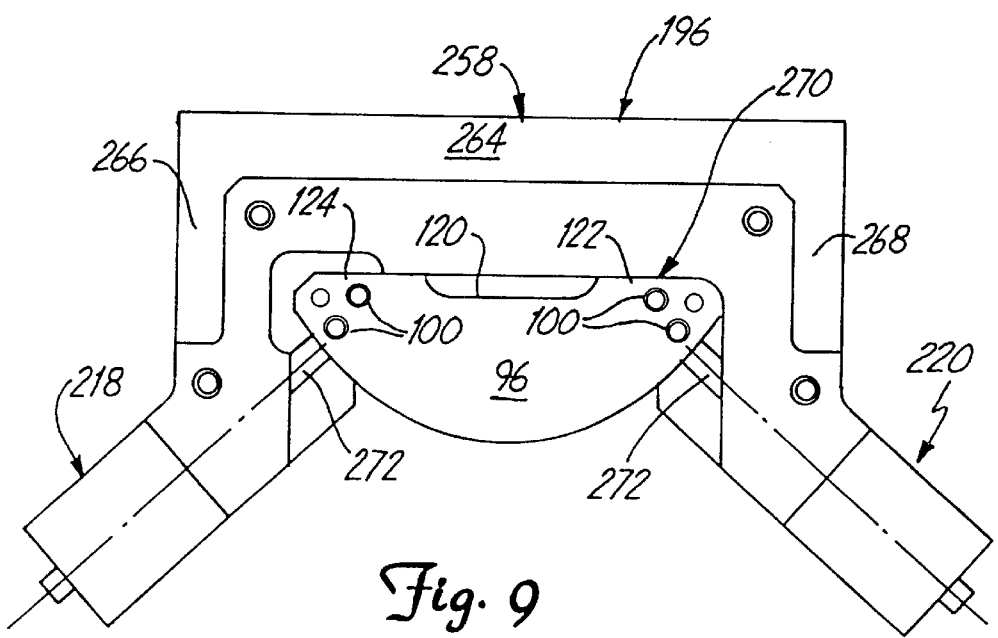
FIG. 9 is a plan view of the backiron nest of the magnet and backiron bonding assembly supporting a backiron.

FIG. 9 is a detailed plan view of nest 196 and clamps 218, 220. Nest 196 includes back support 264 and opposed arms 266, 268 which form a generally U-shaped member. Support 264 and arms 266, 268 are coupled to plate 252 to form nest recess 270. Clamps 218, 220 are coupled to arms 266, 268. Clamps 218, 220 include clamp rods 272 which extend through arms 266, 268 to move between a retracted position and a clamped position. In the retracted position, rods 272 are not aligned with nest recess 270 so that backiron 96 may be inserted. In the clamped position, rods 272 extend into recess 270 to secure backiron 96.

Backiron 96 (shown in phantom in FIG. 9) is inserted into recess 270 and edges 122, 124 are aligned with support 264. Backiron 96 is aligned in nest 196 by inserting an alignment pin (not shown) (preferably a diamond shaped pin) through holes 262 of the nest plate 252 (shown in FIG. 8) and shifting backiron 96 so that the pin aligns with holes 100.

Figure 10:
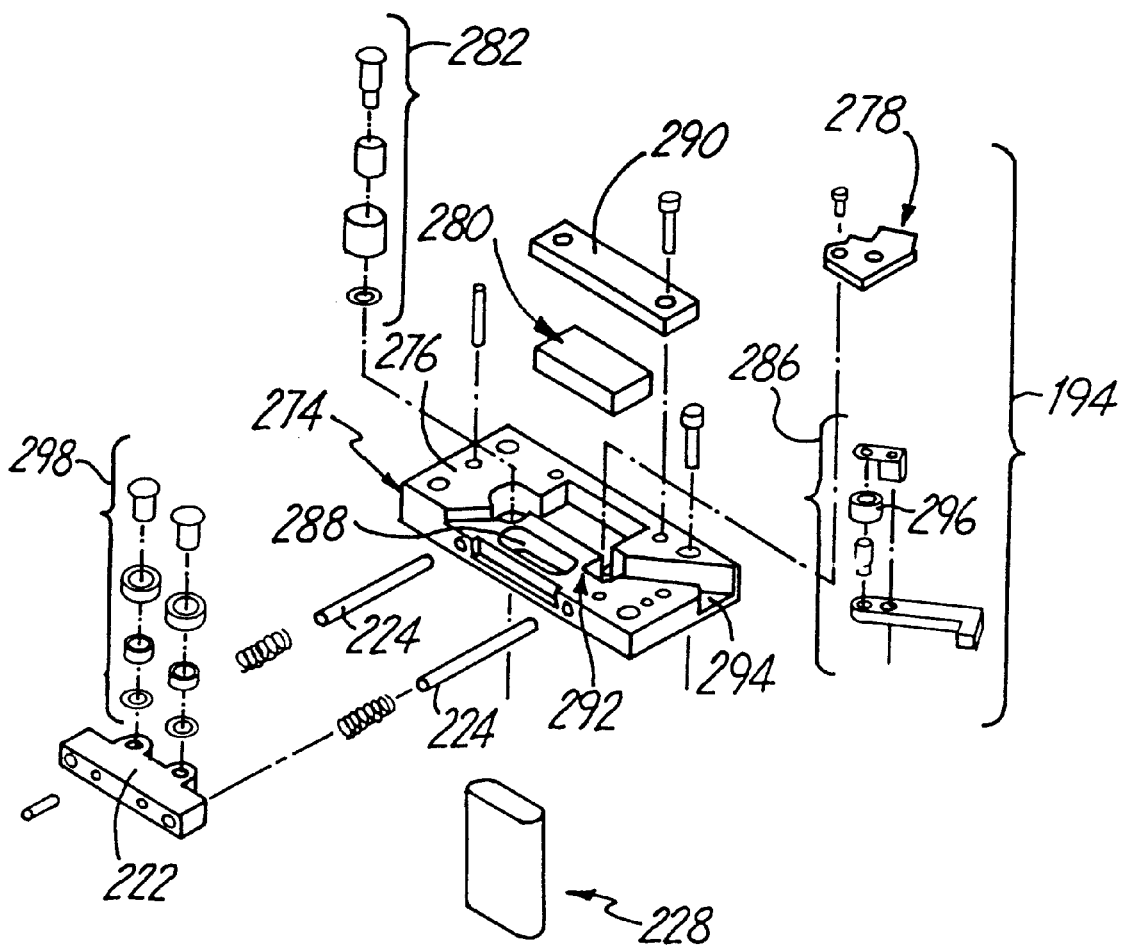
FIG. 10 is an exploded view of the magnet nest and retaining core assembly of the magnet and backiron bonding assembly.

FIG. 10 is an exploded view illustrating nest 194 and core 228. Magnet nest 194 includes base 274 supporting integral slide block 276, side block 278, front alignment block 280, bearing 281, side roller assembly 286, and retaining core opening 288. Block 278 is attached to base 274 and side blocks 276, 278 and 280 form recess 292.

Bearing 282 is coupled to base 274. Side roller assembly 286 is coupled to base 274 at channel 294 and includes roller 296 aligned with recess 292. Bearing 274 and roller 296 are aligned to engage a magnet in nest 194 and provide a tight fit with restricted lateral movement. Block 280 provides a forward alignment surface for magnet 98.

Opening 288 is positioned within nest recess 292 receiving retainer core 228 therethrough to retain magnet 98 in nest 194. Core 228 is movably supported relative to opening 288 between a retracted position and retaining position. In the retaining position, retaining core 228 is aligned with opening 288 to retain magnet within nest 194. In particular, the core 228 is aligned approximately 0.005–0 inches (0.127 mm–0 mm) from a magnet 98 supported in nest 194. In the retracted position, retaining core 228 is lowered from alignment with opening 288 to release magnet 98. Preferably, retaining core opening 288 is sized approximately 75% of magnet 98.

Figure 11:
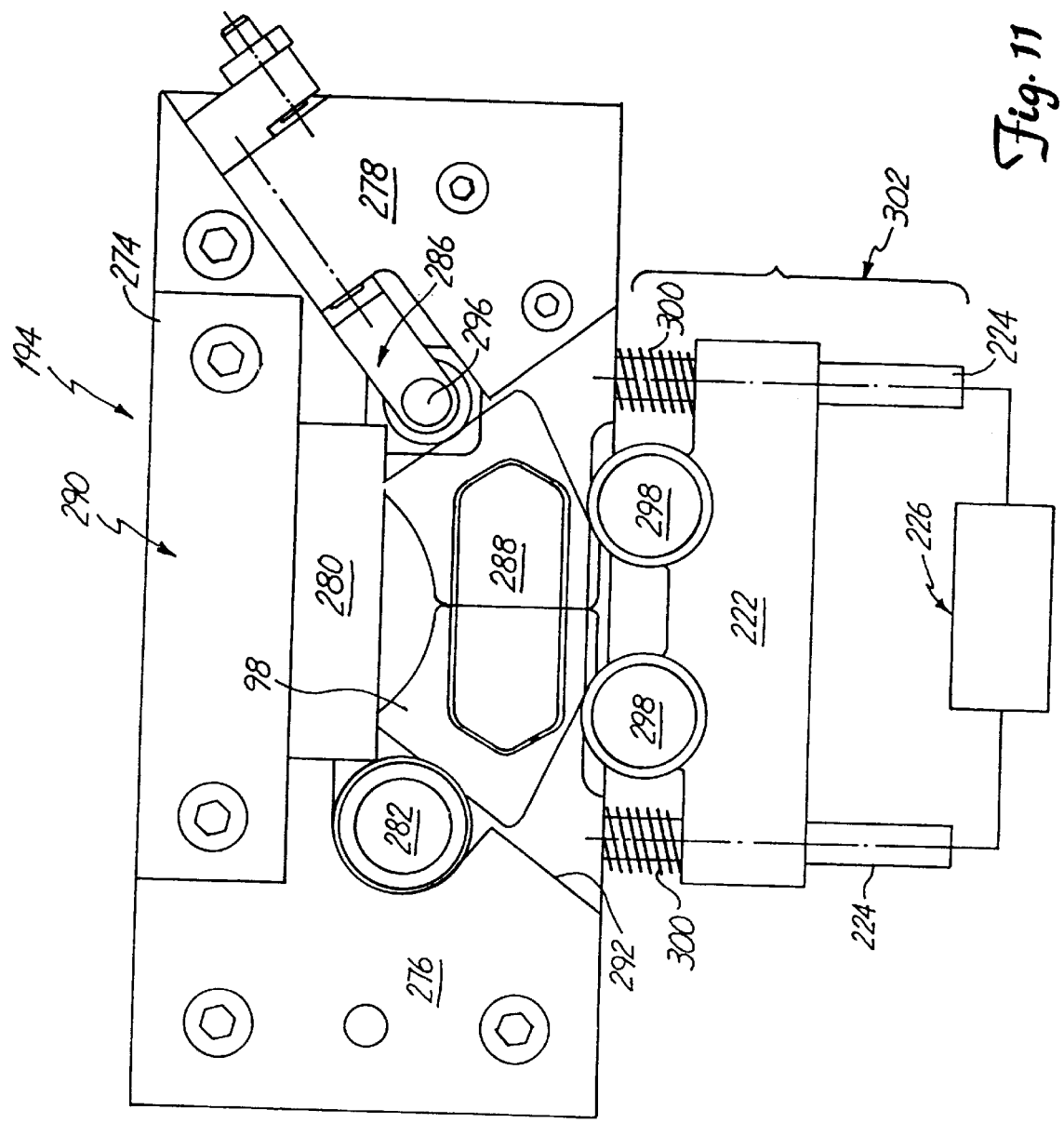
FIG. 11 is a plan view of the magnet nest and back clamp of the magnet and backiron bonding assembly.

Base 274 supports rods 224. Back clamp 222 is movably supported by rods 224 and includes roller 298 for engaging and biasing a magnet 98 toward front alignment block 280. As shown in FIG. 11, clamp 222 is spring biased in the retracted position via spring 300. Clamp 222, rods 224, rollers 298 and springs 300 form clamping assembly 302. Clamp 222 is actuated to the clamped position via actuator 226. Bearing 282 and assembly 286 provide lateral support and clamp 222 and block 280 provide front and back support for a magnet secured in nest 194.

Figure 12:
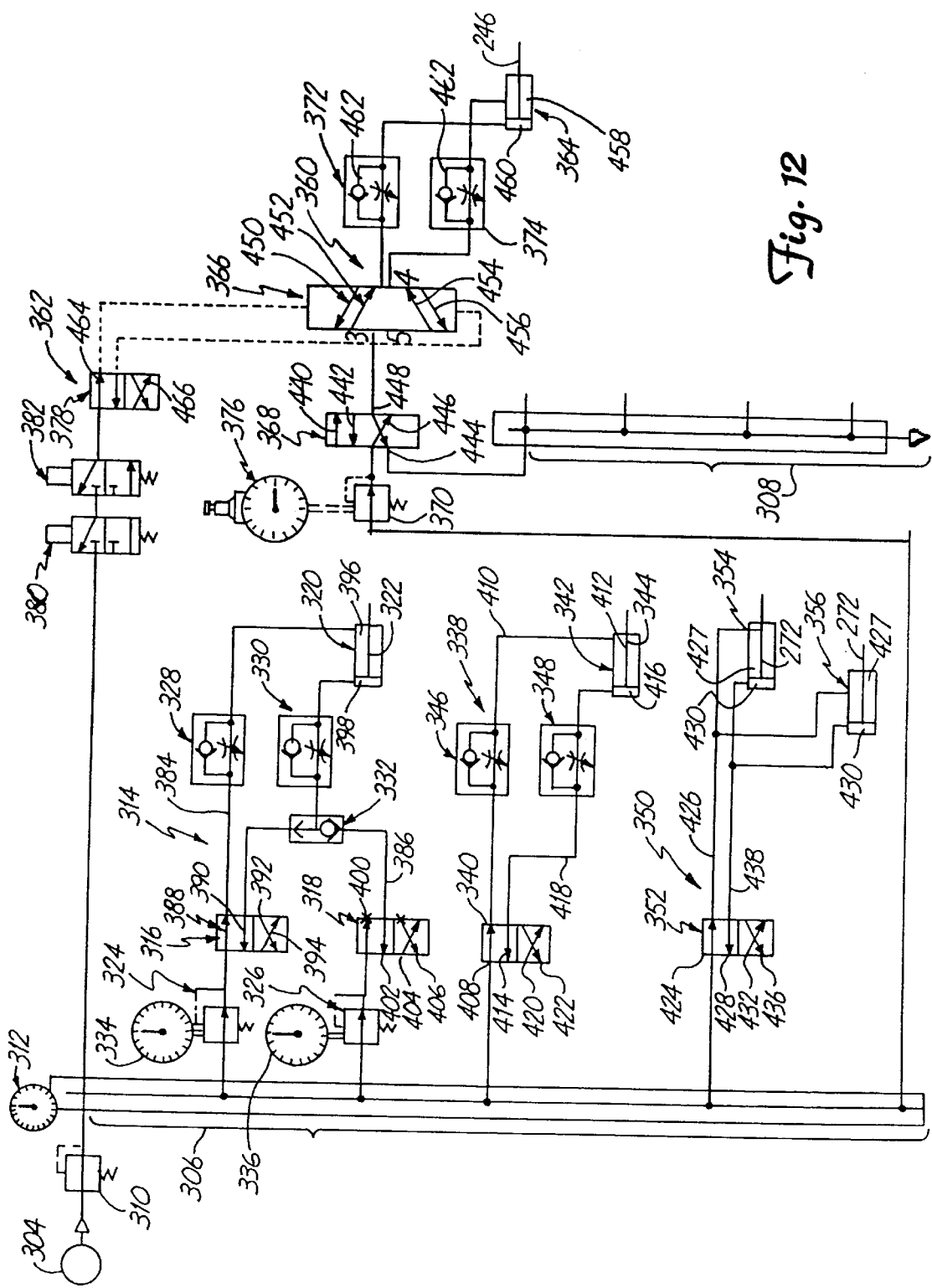
FIG. 12 is a schematic view of a system for operating back clamp of magnet nest, backiron clamps, retaining core and slide assembly of the magnet and backiron bonding assembly.

FIGS. 12–17 are schematic views illustrating operation of a pneumatic system for operating assembly 198, assembly 226, core 228 and clamps 218, 220. Although a pneumatic system is described any fluid pressure system can be used. The term fluid refers to gas or liquid. As shown in FIG. 12, the system includes air supply 304, air distribution manifold 306 and an exhaust manifold 308. Actuation circuits for the operating assembly 198, assembly 226, core 228 and clamps 218, 220, respectively are coupled to manifold 306. The supply of air pressure is controlled by regulator valve 310 which is adjustable via regulator gauge 312. Preferably, the operating pressure to the system is set at 80 psi.

Clamp 222 is actuated via a back clamp actuation circuit 314. Clamp 222 is operated via switches 232, 234 coupled to toggle valves 316, 218. Valves 316 and 318 are coupled to clamp actuator cylinder 320 having actuator rod 322 (coupled to clamp 156), movable within cylinder 320, between the retracted position and the clamped position. Circuit 314 includes regulator valves 324 and 326, adjustable resistance flow control circuits 328 and 330, and shuttle valve 332. Valves 324 and 326 are adjustable pilot valves to control operating pressures of circuit 314. Actuation pressure of the regulator valves 324 and 326 is manually controlled via regulator gauges 334 and 336.

Core 228 is actuated via retaining core actuation circuit 338. Toggle valve 340 operates retaining core actuation cylinder 342 which includes actuator rod 344 operable within cylinder 342 between the retaining and retracted positions. Rod 344 is coupled to core 228 to raise and lower core 228.

Clamps 218, 220 are actuated via backiron clamp actuation circuit 350. The backiron clamps 218 and 220 are actuated via toggle switch 238 coupled to toggle valve 352. Valve 352 operates actuation rods 272 within cylinders 354, 356 between the retracted and clamped positions. The slide actuator circuit includes actuation circuit 360 and control circuit 362 coupled to manifold 306. Circuit 360 is coupled to cylinder 364 having rod 246 operable therein. Circuit 360 includes a pilot operated directional valve 366, toggle valve 368, regulator valve 370 and flow control circuits 372 and 374.

Valve 366 is operable between multiple positions for moving rod 246 between the retracted and bonding positions. Rod 246 is actuated via valve 368 coupled to switch 238. Valve 370 controls the actuation pressure of slide actuation circuit 360. Regulator gauge 376 is coupled to valve 370 for setting the operating pressure. Circuit 362 operates directional valve 366 for shifting between up/down operation of slide 208. Control circuit 362 includes valve 378 and valves 380, 382. Valve 378 is coupled to switch 240 and operable thereby. Valves 380, 382 are coupled to operation buttons 242, 244.

Switch 240 is moved between the up/down toggle positions for controlling valve 378 for raising and lowering slide 208. Switches 242, 244 are moved between the on/off positions to provide on/off control to valves 380, 382 for operating valve 366 to raise or lower slide 208.

Figure 13:
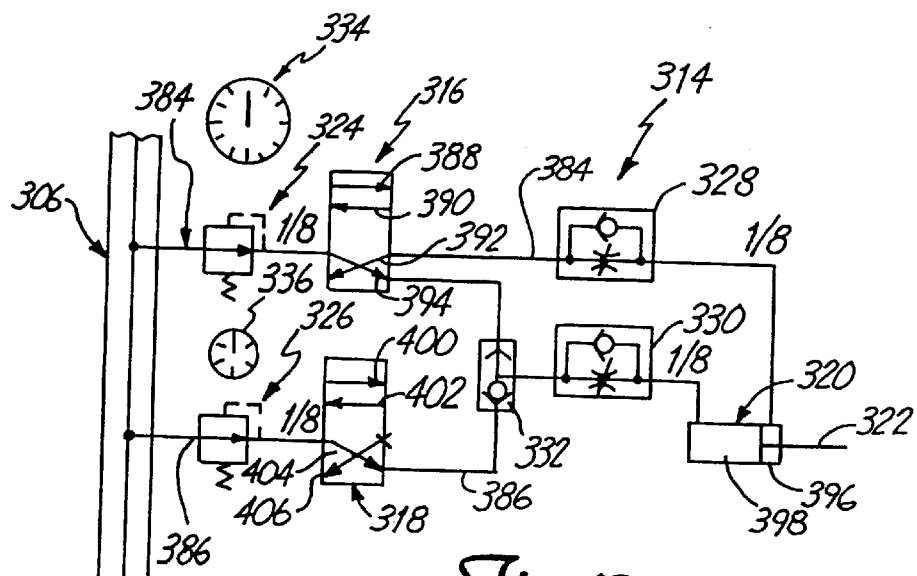
FIG. 13 is a schematic view of a back clamp actuation circuit in a clamped position.

FIGS. 12 and 13 comparatively illustrate operation of the circuit 314 which controls clamp 222. Prior to operation, both valves 316, 318 bias the rod 322 (and clamp 222) in a retracted position as shown in FIG. 12. During operation, valves 316, 318 are in an operation position so that air pressure is supplied to extend rod 322 to the clamped position to operate clamp 222.

Circuit 314 includes a low pressure line 384 and a high pressure line 386. Valve 316 is coupled to line 384 to provide for low clamping pressure to the back clamp 222. Valve 318 is coupled to the high pressure line 386 to provide high clamping pressure to clamp 222. The operating pressure of line 384 is controlled by valve 324. The operating pressure of the line 386 is controlled by valve 326. Preferably, the operating pressure for the line 384 is approximately 40 psi (lb/in$^2$) (2.75×10$^5$ N/m$^2$) and the operating pressure for the line 386 is approximately 80 psi (lb/in$^2$) (5.51×10$^5$ N/m$^2$)

Valve 316 includes retraction channels 388, 390 and actuation channels 392, 294. When switch 232 is off, valve 316 is aligned to supply air pressure through channel 388 to retraction chamber 396 and channel 390 is aligned with chamber 398 to exhaust air pressure to retract rod 322. When switch 234 is off, retraction channels 400 and 402 of valve 318 are aligned with line 386, as shown in FIG. 12, so that no air pressure is supplied to the cylinder 320. Shuttle valve 332 includes a check valve which limits flow from chamber 398 and thus air pressure released from chamber 398 is released through channel 390.

FIG. 13 illustrates valve 316 in the actuation position with channels 392 and 394 aligned with line 384 so that air pressure is shunted through valve 332 to clamp the clamp 222. The check valve of valve 232 limits flow from valve 316 to valve 318 so that pressure is delivered to the chamber 398. Valve 318 is shown in the actuation position with channels 404, 406 aligned with line 386 so that air pressure is delivered to channel 406 to the actuation chamber 398. Valve 318 is shown in the actuation position with channels 404, 406 aligned with line 386 so that air pressure is delivered to channel 406 to the actuation chamber 398 to provide high pressure for clamping back clamp 222. Preferably, the high and low pressure circuits are actuated in sequence to secure magnet 98 in nest 194. Circuits 328 and 330 provide fluid passage to chamber 396 and chamber 398, however, the flow rate of exhausted fluid may be controlled to provide sufficient resistance- (back pressure) whereby clamp 222 is controllably clamped and released. Preferably, the cylinder 320 provides 250 pounds (890 Newtons) of force to rod 322 to secure the magnet 98 in magnet nest 194 via clamp 222.

Figure 14:
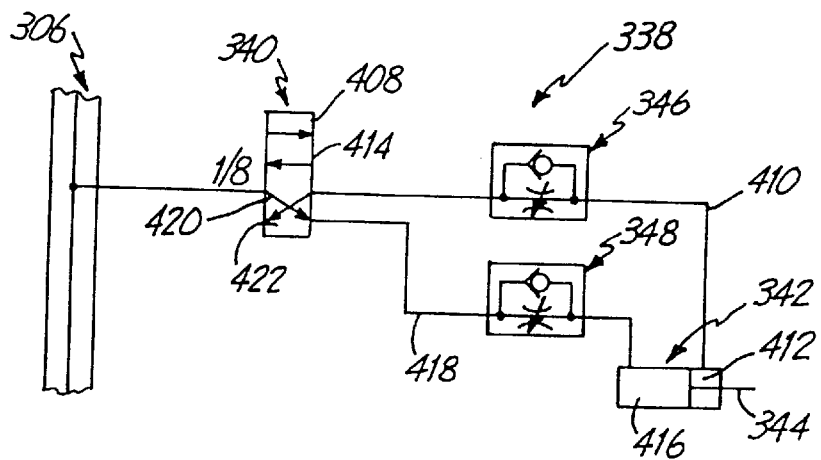
FIG. 14 is a schematic view of a retaining core actuation circuit in an operation position.
Figure 15:
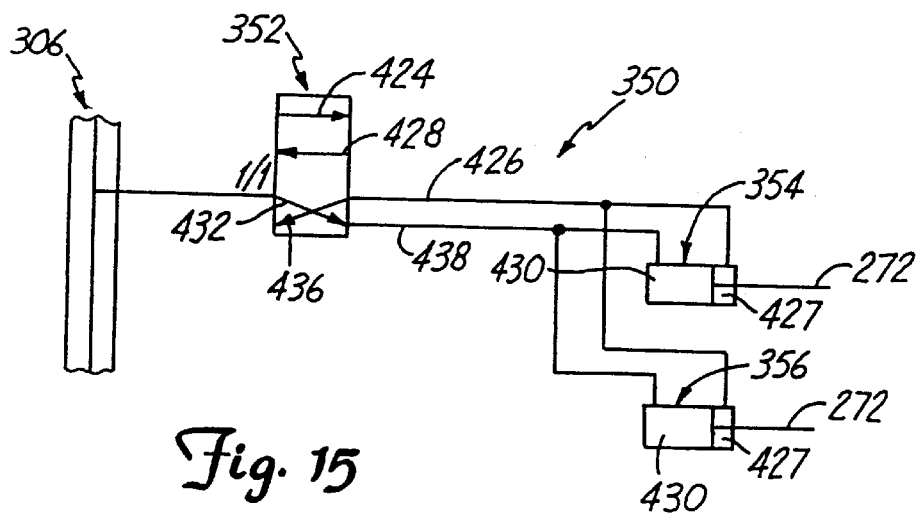
FIG. 15 is a schematic view of a backiron actuation circuit in a clamped position.

FIGS. 12 and 14 illustrate operation of circuit 338 which is operated via valve 340. In the retracted position, valve 340 is aligned so that channel 408 is coupled to manifold 306 and line 410 to supply air pressure to chamber 412 to retract rod 344 and channel 414 of valve 340 is coupled to chamber 416 via line 418 an exhaust manifold 308 to release pressure from chamber 416.

To actuate retaining core 228, switch 236 is switched "on" to shift valve 340 from the position shown in FIG. 14 to the position channel 420 is aligned with manifold 306 and chamber 416 to supply air pressure to extend rod 344. Channel 422 is coupled to chamber 412 via line 410 and manifold 308 to release pressure as shown in FIG. 14 and position core 228. Circuits 346, 348 provide fluid passage to chamber 412 and chamber 416, however, the flow rate of fluid exhausted from chambers 412, 416 may be controlled. Preferably, the retaining core cylinder 342 provides 400 pounds (1355 Newtons) of force to the retaining core 228 to balance the magnet attraction force of 100–120 pounds (445–534 Newtons) to the backiron 96.

FIGS. 12–15 illustrate operation of circuit 350 for securing backiron 96 in the retracted and clamped positions, respectively. In the retracted position, channel 424 is coupled to manifold 306 and line 426 to supply air pressure to chamber 427 of cylinders 354 and 356 to retract rods 272 of clamps 218, 220 and release backiron 96. Channel 428 is coupled to chambers 430 of cylinders 353 and 356 and exhaust manifold 308 to release pressure from actuation chamber 430. In the clamped position, actuation channel 432 is aligned between supply manifold 306 and chamber 430 to supply pressure to extend rods 272 to the clamped position. Pressure is released from retraction chamber 427 via channel 436 and line 438. Preferably, cylinders 354, 356 provide 20 pounds (178 Newtons) of force to rods 272 to secure the backiron 96 in nest 196.

Figure 16:
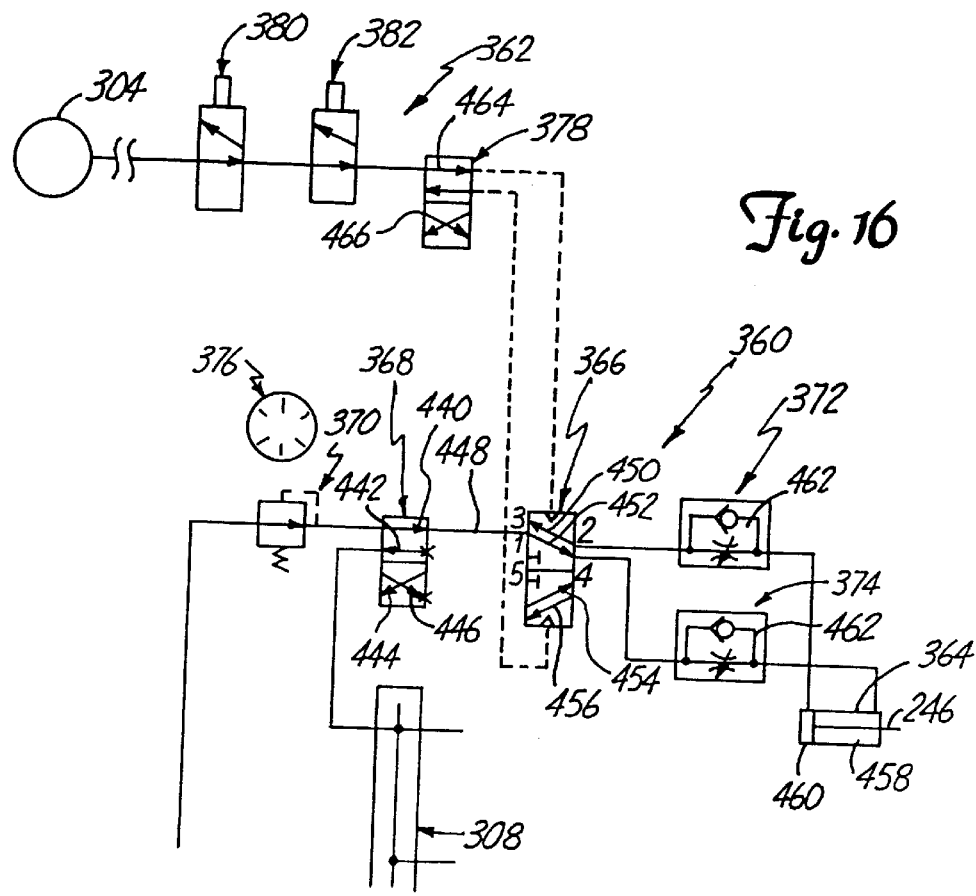
FIGS. 16 and 17 are schematic views of a slide actuation circuit in opened and closed positions, respectively.

FIGS. 12 and 16 illustrate the circuit 360 in the closed and opened positions, respectively. Slide 208 is actuated via an on/off switched coupled to valve 368. Valve 368 includes opened channels 440, 442 and closed channels 444, 446. In an opened position, channel 440 is coupled between manifold 306 and line 448 for supplying fluid pressure to the cylinder 364. In a closed position, fluid pressure is not supplied to cylinder 364 and closed channel 444 is coupled to line 448 and manifold 308.

Figure 17:
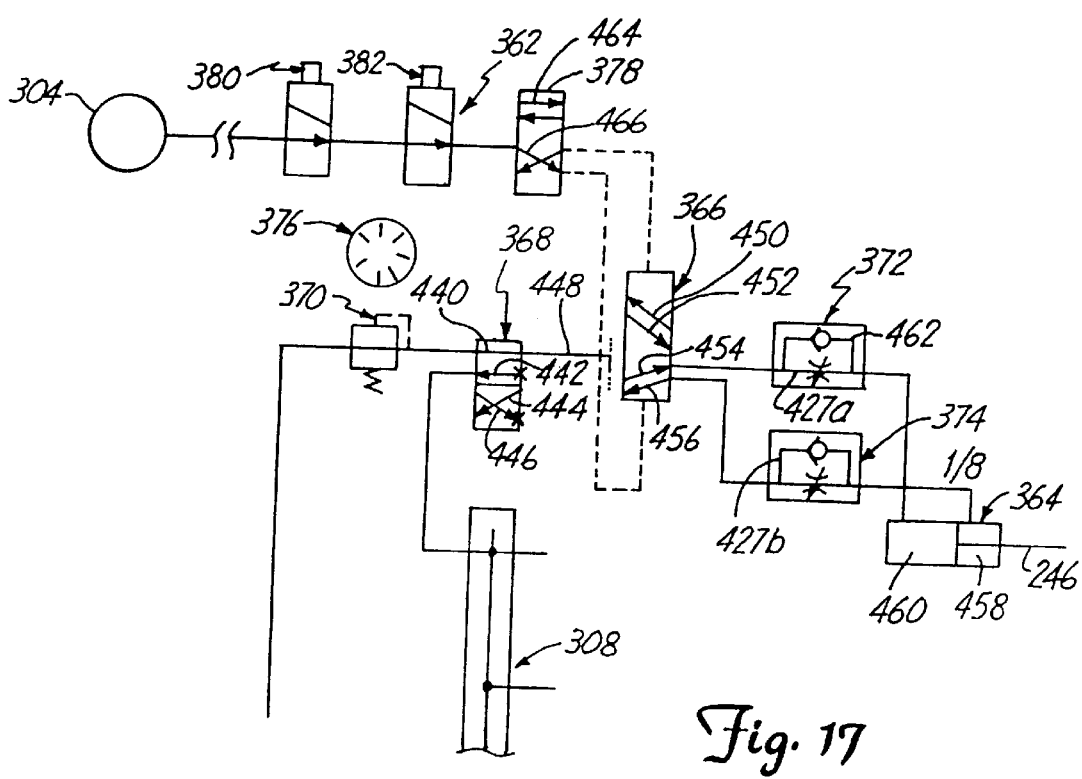

Pressure in circuit 360 is controlled via valve 370. The regulator gauge 376 is set so that the operating pressure in the circuit 360 is less than 80 psi. Actuation pressure is supplied from the line 448 to the cylinder 364 via valve 366. Valve 366 has three operational positions: a retraction position, a closed position and an extension position (FIGS. 12, 16 and 17, respectively).

Valve 366 includes channels 450, 452 and channels 454, 456. In the closed position, channels 450 and 452 and channels 454, 456 are not aligned with line 448 such that no air pressure is supplied to cylinder 364. In the retraction position, channel 432 couples line 448 to chamber 458 for supplying air pressure to chamber 458 to retract slide 208.

In the extension position, air pressure is supplied via channel 454 to chamber 460. Channel 456 is aligned with retraction chamber 458 to exhaust air to manifold 308. Circuits 372, 374 provide fluid passage to chamber 460 and chamber 458, and provide restricted fluid passage (through line 462) from chamber 460 and chamber 458 to control the rate of movement of slide 208 so that the backiron is not slammed into the magnet when slide 208 is extended, nor slide 208 slammed into slide base 206 when slide 208 is retracted.

Operation of directional valve 366 is controlled via circuit 362 through direction valve 378 and on/off valves 380, 382. Valves 380, 382 are controlled via an on/off toggle switch to supply fluid pressure to actuate valve 366 from the closed position shown in FIG. 12 to the extension position or the retracted position. FIG. 12 illustrates valves 380, 382 in the opened position and FIGS. 16, 17 illustrate valves 380, 382 in the closed position for operating valve 366. Both valves 380, 382 must be in the closed position to operate valve 366. Orientation of valve 366 between the retracted position and the extension position is controlled via valve 378 coupled to switch 240. In the retracted pilot position, channel 464 is aligned with manifold 306 and valve 366 to bias channels 450, 452 to supply air pressure to chamber 458 for raising rod 246 and slide 208. In the extension pilot position, channel 466 is aligned with manifold 306 and valve 366 to supply air pressure to chamber 460 for extending (lowering) rod 246.

A high energy magnet is provided which can be bonded to a backiron to construct a high capacity motor for a high capacity disc drive. The magnet is bonded to the backiron with the device of the present invention. The device is capable of controlling and aligning the magnet and backiron during bonding. It should be understood that the system for operating slide 208, clamps 218, 220, clamp 222 and core 228 has been described with respect to a pneumatically operated system, but that other systems and constructions may be employed such as a hydraulic fluid system, or electric system. As described, the retaining force of clamps 218, 200, clamp 222 and core 228 provides sufficient resistance to the attraction force between the magnet and backiron.

The device is not limited to the construction shown and other devices may be used to retain the magnet and backiron. Additionally, the force supplied to clam 222, clamps 218, 200, retaining core 228 may vary, but must be sufficient to secure the magnet 98 and backiron 96 in nests 194, 196 for bonding. Magnet 98 and backiron 96 should be supported so that when the backiron nest 196 is positioned adjacent to the magnet nest 914 for bonding, the magnet and backiron will be correctly aligned to bond the magnet and backiron in correct registration. Thus, it is important that nests 194, 196 be in proper alignment prior to operation. To preset the alignment, a magnet master and backiron master are secured within the magnet nest 194 and backiron nest 196. The backiron master and magnet master are not formed of a magnetic material so there is no attraction force.

Figure 18:
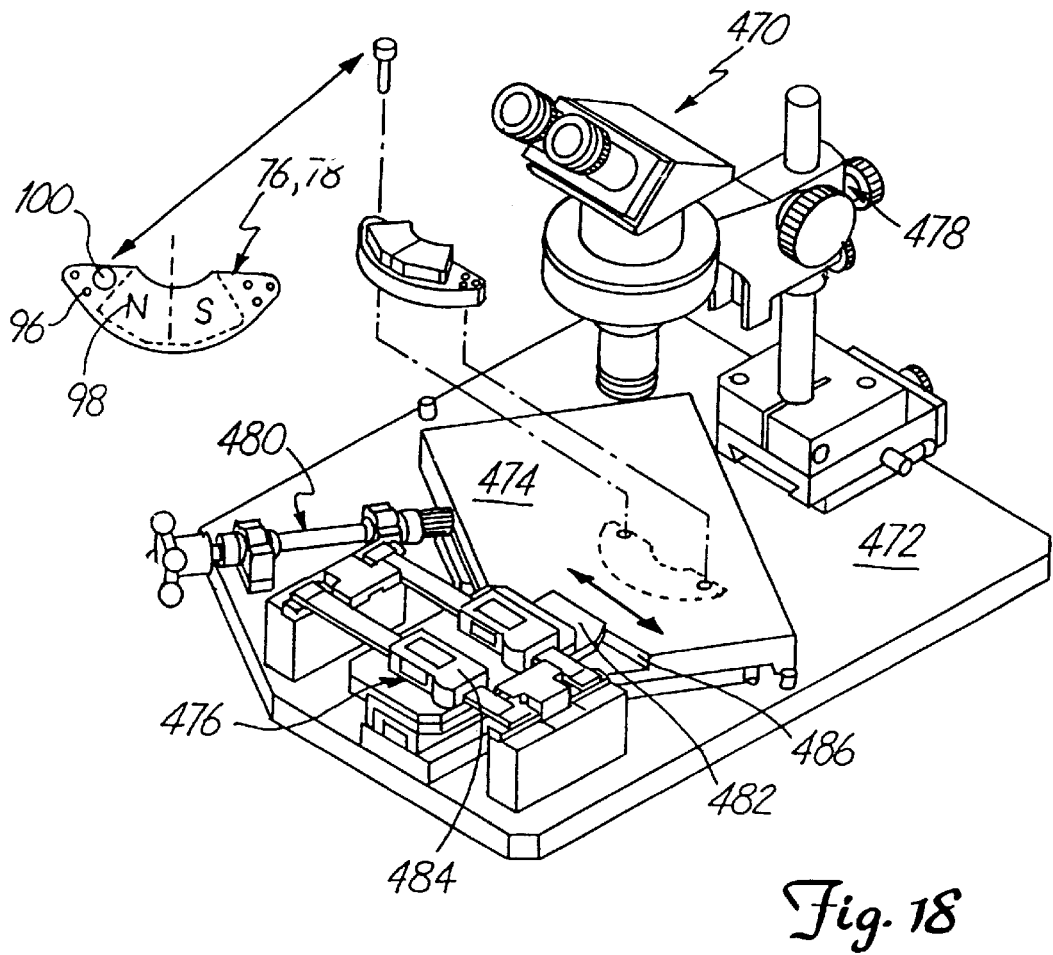
FIG. 18 is a perspective view of an apparatus for verifying alignment of a magnet bonded to a backiron.

The backiron master includes a plurality of pins and the magnet master includes a plurality of holes. When nests 194, 196 are in proper alignment, the pins of the backiron master extend into the holes of the magnet master. If the pins of the backiron master do not align with or extend into the holes of the magnet master, the nests 194, 196 must be adjusted. As shown in FIG. 18, to adjust the position of nest 196 relative to nest 194, attachment of base 258 to plate 252 is adjusted by varying the tension on the screws a–d. In particular, screws a–d are loosened and then retightened until the proper alignment between the nests 194, 196 is achieved. Screws a–b are tightened in the following pattern: screw a, screw c, screw b and screw d. The screws a–d are tightened in increments according to the above-described pattern until the proper force is achieved. Thus, as described, the magnet and backiron bonding assembly 190 of the A plurality of magnet segments 92, 94 are used to form a high energy composite magnet 98. The bonding apparatus of the present invention aligns and bonds the magnet and backiron within plus or minus 0.002 inches (0.05 MM) in both the x and y directions.

After bonding, it is important to verify that the magnet and backiron have been bonded in correct registration. FIG. 18 illustrates an apparatus 470 for verifying the centering (left/right placement) of magnet 98 on backiron 96. Apparatus 470 includes base 472, 478 and extendable rod 480. Platform 474 is movably supported relative to base 472. Micrometer 476 includes moveable gauge arm 482 and a graduated distance scale 484. Arm 482 extends from micrometer 476 into recess 486 of tool platform 474. When the platform 474 is moved it contacts arm 482 so that arm 482 moves therewith. Scale 484 is coupled to arm 482 to indicate the distance the gauge arm 482 has moved. Extendable rod 480 is supported relative to base 472 and is designed to incrementally move platform 474.

Microscope 478 is supported by base 472 in alignment with platform 474. The microscope includes a reference line. An assembled magnet and backiron is placed on platform 474 and hole 100 of backiron 96 is aligned relative to reference line of microscope 478. Graduated distance scale 482 of micrometer 476 is zeroed. Platform 474 is moved via rod 480 to position the reference line of microscope 478 relative to a center position of magnet and backiron assembly. The distance that platform 474 is moved is measured by scale 484 and corresponds to a distance between a center of the magnet and backiron assembly and the reference position of hole 100. The measured distance is compared with acceptable tolerance ranges to determine if the magnet and backiron has been properly assembled and is acceptable for commercial use.

Figure 19:
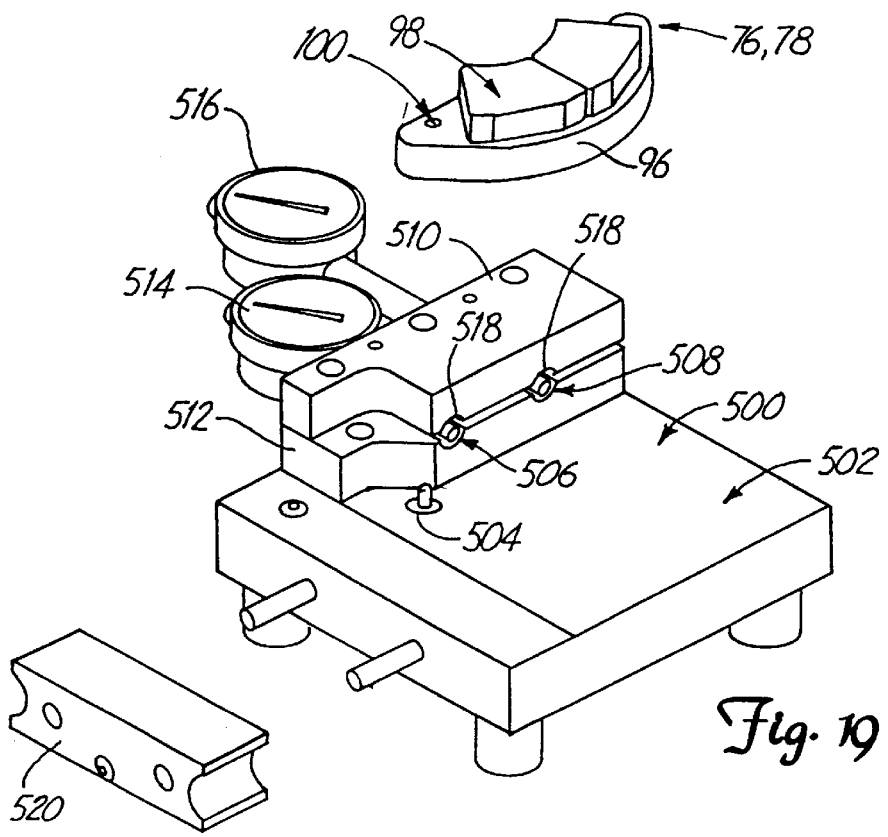
FIG. 19 is a perspective view of a front alignment verification device.

FIG. 19 is a perspective view of front alignment verification device 500, including base 502, backiron placement pin 504, left and right pressure contacts 506, 508, contact supports 510, 512 and pressure gauges 514, 416. Pin 504 extends from base 502 and is sized for insertion through hole 100 of backiron 96. Contacts 506, 508 are supported by contact supports 510, 512. Contact 506, 508 include rods 518 coupled to pressure gauges 514, 516. Rods 518 are aligned relative to a front edge of a supported magnet and backiron. Gauges 514, 516 indicate pressure on contacts 506, 508. A magnet and backiron assembly is placed on base 502 and pin 504 is inserted through hole 100 to align a front portion of magnet and backiron assembly relative to contacts 506, 508. A zero tool 520 is used to zero gauges 516, 516. As shown, the zero tool 520 is formed of an elongated member sized to simultaneously engage contacts 506, 508 for calibrating gauges 516, 516.

It is important that the magnet segments 92, 94 and magnets 98, be protected from damage prior to assembly. If magnet segments 92, 94 and magnets 98 are stored in an environment where the magnets 92, 94 and magnets 98 are susceptible to being dropped or smashed, then the magnets may be destroyed prior to assembly. Neodymium magnets are formed of compressed particles. If a neodymium magnet is cracked or smashed, the particles may disperse causing contamination to the assembly environment. The contamination may deposit on assembled motors and an assembled disc drive affecting the performance of the disc drive.

Figure 20:
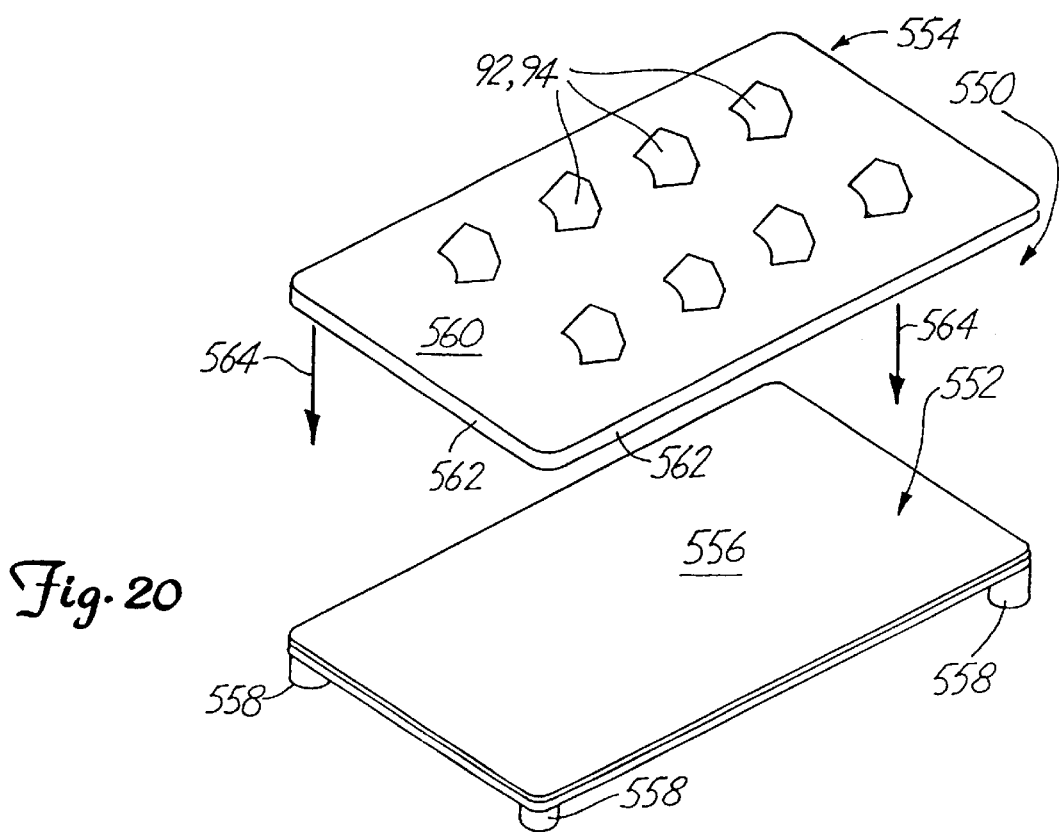
FIG. 20 is a perspective view of an apparatus for storing magnet segments and magnets for assembly.

FIG. 20 illustrates an apparatus 500 for storing magnet segments 92, 94 and magnets 98 (not shown in FIG. 20) for assembly. As shown, the apparatus 550 includes a tray 552 and a cover 554. The tray 552 includes a base 556 and legs 558 coupled to the base 556 for supporting the base 556 on a planar surface. The base 556 is formed steel material to attract the magnets to the tray 552 to hold the magnets to the tray 552. The force holding the magnet segments 92, 94 and magnets 98 to the tray 552 is sufficient to secure the magnets so that the magnets do not slide or fall off the tray 552. The attraction force is low enough to allow an operator to pick the magnet segments 92, 94 and magnets 98 off the tray 552 for assembly.

The cover 554 is formed of a plastic material and is removably coupled to tray 552. The cover 554 includes a plate 560 and edges 562. Edges 562 extend about the perimeter of plate 560. The cover 554 (i.e. plate 560) is sized similar to base 556 and is designed over base 556 as illustrated by arrows 564 for use.

The cover 554 is removed from tray 552 for cleaning. The cover 554 is cleaned to remove debris so that the debris does not contaminate a disc drive. As shown in FIG. 20 magnet segments 92, 94 and magnet 98 (not shown) are orientated in the same direction so that the magnets repel each other rather than attract each other.

The instant magnet and backiron 76, 78 includes a high energy magnet 98 useful with motors for high density disc drives. The magnet 98 may be energized with existing equipment and is formed of energized magnet segments 92, 94 bonded to form a composite magnet 98 which is bonded to a backiron 96. The magnet segments 92, 94 and backiron 96 are precisely assembled without damage to the magnet. The magnet segments 92, 94 are supported in spaced magnet nests 146, 148 to accurately align the segments for bonding. The composite magnet 98 and backiron 96 are supported for bonding in nests 194, 196, which may be prealigned. Since the magnet 98 and backiron 96 are within close tolerance ranges, the stator 70 constructed with the magnet and backiron assembly will have relatively high flux density allowing more efficient operation of the motor.

Thus, as described, the high energy magnet is bonded to a backiron by an apparatus including a magnet nest 194 and backiron nest 196. A magnet is retained in the magnet nest via a magnet nest retainer and the backiron is retained in the backiron nest via a backiron nest retainer. The magnet nest 194 and backiron nest 196 are coupled to the base 192 for operation between a spaced operational position and an adjacent bonding position.

Energized magnet segments are joined to form the high energy magnet via an apparatus including a first platform 136 and a second moveable platform 138 coupled to a base 134. The first and second platforms 136, 138 include magnet nests 148, 146 for supporting magnet segments. The second platform 138 is movable between a retracted position and a bonding position. Magnet segments are inserted into magnet nests 148, 146 while the second platform 138 is in the retracted position. The second platform 138 are moved from the retracted position to the bonding position to bond magnet segments. The apparatus including a compressible member 140 for controlling the attraction of the first magnet nest 148 and the second platform 138 supporting a magnet segment in the second magnet nest 146.

It is to be understood that even though numerous characteristics and advantages of various embodiments of the present invention have been set forth in the foregoing description, together with details of the structure and function of various embodiments of the invention, this disclosure is illustrative only, an change may be made in detail, especially in matters of structure and arrangement of parts within the principles of the present invention to the full extent indicated by the broad general meaning of the terms in which the appended claims are expressed. For example, the particular elements may vary depending on the particular functionality without departing from the scope and spirit of the present invention. In addition, it will be appreciated by those skilled in the art that the teachings of the present invention can be applied differently, without departing from the scope and spirit of the present invention.

What is claimed is:

1. A method comprising steps of:
   magnetizing a magnet;
   storing the magnetized magnet on a tray including a plate formed of a magnetically attractive material; and removing the magnetized magnet from the tray for assembly in a data storage device.

2. The method of claim 1 wherein a plurality of magnetized magnets are stored on the tray and removed for assembly.

3. The method of claim 1 and further comprising:

secure a cover plate over the plate formed of the magnetically attractive material to support the magnetized magnets; and removing the cover plate after removing the magnetized magnets from the tray for assembly in the data storage devices.

4. The method of claim 3 and further comprising the step of:

cleaning the cover plate to remove debris.

* * * * *